(12) United States Patent
Interwies (10) Patent No.: US 11,667,582 B2
(45) Date of Patent: Jun. 6, 2023

(54) METHOD FOR INFILTRATING A CERAMIC, ARTIFICIAL OR NATURAL STONE SURFACE

(71) Applicant: COSENTINO RESEARCH & DEVELOPMENT, S.L., Almeria (ES)

(72) Inventor: Jan Interwies, Landshut (DE)

(73) Assignee: COSENTINO RESEARCH & DEVELOPMENT, S.L., Almeria (ES)

( * ) Notice: Subject to any disclaimer, the term of this patent is extended or adjusted under 35 U.S.C. 154(b) by 476 days.

(21) Appl. No.: 16/309,775

(22) PCT Filed: Jul. 31, 2017

(86) PCT No.: PCT/EP2017/069336
§ 371 (c)(1),
(2) Date: Dec. 13, 2018

(87) PCT Pub. No.: WO2018/020052
PCT Pub. Date: Feb. 1, 2018

(65) Prior Publication Data
US 2020/0181033 A1 Jun. 11, 2020

(30) Foreign Application Priority Data
Jul. 29, 2016 (DE) ..................... 10 2016 114 000.7

(51) Int. Cl.
*C04B 41/45* (2006.01)
*C03C 17/30* (2006.01)
(Continued)

(52) U.S. Cl.
CPC .......... *C04B 41/4556* (2013.01); *C03C 17/30* (2013.01); *C04B 41/4554* (2013.01); *C04B 41/4966* (2013.01); *C04B 41/4972* (2013.01); *C03C 2217/76* (2013.01); *C03C 2218/32* (2013.01); *C04B 2111/27* (2013.01); *Y10T 428/4935* (2015.04)

(58) Field of Classification Search
CPC . C03C 17/30; C03C 2217/76; C03C 2218/32; C03C 2111/27; C04B 41/4554; C04B 41/4966; C04B 41/4972; C04B 2111/27; Y10T 428/4935
See application file for complete search history.

(56) References Cited

U.S. PATENT DOCUMENTS

2011/0308423 A1* 12/2011 Friedel ................. C04B 41/009
106/2

FOREIGN PATENT DOCUMENTS

DE 103 46 018 4/2005
DE 103 46 081 5/2005
(Continued)

*Primary Examiner* — Kelly M Gambetta
(74) *Attorney, Agent, or Firm* — Leason Ellis LLP (57) ABSTRACT

The object of the invention is a method for infiltrating a ceramic, artificial or natural stone surface, wherein a material forming a bond with valences on the surface is applied and mechanically rubbed onto the surface, whereby frictional heat is generated, wherein the material is used as a solution or suspension, and which comprises applying a hydrophobizing infiltration composition onto the surface to be coated, followed by rubbing it in until a homogeneous distribution and filling of the pores in the surface is achieved for improving the surface properties.

20 Claims, 4 Drawing Sheets

(51) Int. Cl.
*C04B 41/49* (2006.01)
*C04B 111/27* (2006.01)

(56) References Cited

FOREIGN PATENT DOCUMENTS

| DE | 10 2009 000614 | 8/2010 | | |
|---|---|---|---|---|
| DE | 10 2011 087060 | 5/2013 | | |
| DE | 10346018 B4 | * | 1/2016 | ............. C04B 41/52 |

* cited by examiner

METHOD FOR INFILTRATING A CERAMIC, ARTIFICIAL OR NATURAL STONE SURFACE

CROSS-REFERENCE TO RELATED PATENT APPLICATIONS

This application is a U.S. National Phase Application under 35 U.S.C. § 371 of International Patent Application No. PCT/EP2017/069336, filed Jul. 31, 2017, which claims the priority of German Application No. 10 2016 114 000.7, filed Jul. 29, 2016, which is incorporated by reference as if expressly set forth in its entirety herein.

The present invention relates to a method for infiltrating a ceramic, artificial or natural stone surface, in particular a method for infiltrating the surface of hydraulically, inorganically or resin-bound natural stone, quartz, ceramic, glass, and/or artificial stone agglomerate, wherein a material forming a bond with valences (i.e. a covalent or ionic bond) on the surface is applied and rubbed onto the surface, whereby frictional heat is generated, and the material is used as a solution or suspension.

Such methods are basically known from the state of the art. Examples are documents DE 103 46 018 and DE 102 01 1087060 from the same applicant.

Document DE 103 46 018 discloses a method, wherein the material applied onto the surface of the substrate is rubbed in the form of an aqueous solution or suspension under higher pressure. Frictional heat is hereby generated in such an extent, that the temperature of an 8 mm-thick plate increases by 10 to 30° C.

Document DE 102 01 1087060 also discloses in particular a composition and a method for treating a mineral substrate.

Both abovementioned documents are aimed at improving one or more of the many different surface properties of the respective substrate.

Although the mentioned state of the art already discloses good solutions for improving the surface properties of mineral substrates, there still exists the need of improved methods and compositions for improving the cost effectiveness and/or for selectively influencing the surface properties of such substrates.

It is therefore the objective of the present invention to at least indicate a method, which solves this underlying technical problem at least partially.

The objective of the present invention is solved in particular by means of a method according to claim 1.

The method can alternatively be described as follows: A method for infiltrating a ceramic, artificial or natural stone surface, wherein the method comprises the following steps:
  (a) applying a hydrophobizing infiltration composition onto the surface of a ceramic, artificial or natural stone,
  (b) rubbing in the hydrophobizing infiltration composition, preferably until a homogeneous distribution and filling of the pores in the surface is achieved, or preferably until filling of at least 20% of the pores in the surface is achieved,
  (c) drying and optionally blowing the surface, and
  (d) abrading or polishing off therefrom excess of material of hydrophobizing infiltration composition,
  wherein the hydrophobizing infiltration composition is used as a solution or suspension.

Advantageous configurations are the object of the claims depending directly or indirectly on same. A ceramic, artificial or natural stone substrate produced according to this method, in particular a hydraulically, inorganically or resin-bound natural stone, quartz, ceramic, glass, and/or artificial stone agglomerate also forms part of the invention and solution to this underlying objective.

In extensive examinations for solving the underlying technical problem it was surprisingly discovered that already applying a hydrophobizing infiltration composition onto a ceramic, artificial or natural stone surface, in particular onto a surface of hydraulically, inorganically or resin-bound natural stone, quartz, ceramic, glass, and/or artificial stone agglomerate, and rubbing in the infiltration composition until a homogeneous distribution and filling of the pores in the surface is achieved, leads to an increase of the surface smoothness, of the surface gloss, of the surface hardness, of the resistance to dirt and chemicals, and the like, for example, and generally to a clear quality increase with respect to the starting substrate or material.

The term "homogeneous distribution" used in connection with the present invention means that the composition is uniformly distributed over the surface, i.e. that the number of pores by area unit (e.g. $cm^2$) infiltrated by the composition does not vary substantially throughout the surface. In other words, the "homogeneous distribution" is achieved when the effect (i.e. hydrophobic effect) achieved by the infiltration is substantially the same in any part of the surface. It is to be understood that the term substantially can refer to a variation of less than 10%, preferably less than 5%.

According to the present invention, a pore in the surface is considered to be filled when at least some of the hydrophobizing composition has infiltrated into the pore. It is understood that the pores in the surface are filled according to the claims, when at least 20% of the pores are infiltrated by some of the hydrophobizing infiltrating composition. The skilled person understands and knows how to determine whether the hydrophobizing infiltration composition entered the pores and how to calculate the portion of pores filed in a surface, e.g. with analytical microscopic techniques such as SEM (scanning electron microscopy) or similar ones. In order to obtain a significant improvement in the properties of the surfaces treated with the hydrophobizing infiltrating composition, it is preferred that at least 40% of the pores are infiltrated. In even more preferred embodiments, the portion of pores infiltrated is at least 60%. In principle, with the appropriate application conditions or with sufficient number of repetitions, there is no limit in the maximum number of pores possible to be infiltrated, and it is possible that the portion of pores infiltrated is higher than 90% or even higher than 95%.

Although the subsequently described ceramic, artificial or natural stone surfaces are in general surfaces of a plate, such as of a slab or of a tile, in particular the surface of artificial stones made of hydraulically or resin-bound natural stone, ceramic, glass, and/or quartz agglomerates, the invention is not limited thereto. In particular, the surfaces need not be planar or flat, but they can basically be in any practicable tridimensional form. However, it must be considered that the method according to the invention is then to be carried out manually or with a lesser degree of automation as a general rule. However, this is not a problem and is basically within the capabilities of the relevant person skilled in the art.

To carry out the method, it is in general preferred for the ceramic, artificial or natural stone surfaces to be treated to be dust-free and dry. The best results are hereby achieved. However, the method can also be carried out when the surface to be treated is wet or moist, for example, when it is required during the method, for example, when drying would be too complicated or would take too long. It depends basically on an overall assessment with respect to the intended product quality and cost effectiveness. However, untreated or unprepared ceramic, artificial or natural stone surfaces can be basically processed or treated following the method according to the invention. In particular, the method according to the invention can be easily integrated in existing methods for producing, processing and/or finishing ceramic, artificial or natural stone substrates in plate form.

In a particular embodiment, the hydrophobizing infiltration composition is a self-repelling hydrophobizing infiltration composition, preferably a spontaneously or quickly self-repelling hydrophobizing infiltration composition.

The term "hydrophobizing infiltration composition" in the context of the present invention refers to any composition capable of penetrating into the pores of the surface of the material to be treated and which after drying and reaction forms a hydrophobic filling in those pores.

The term "self-repelling hydrophobizing infiltration composition" in the context of the present invention refers to any hydrophobizing infiltration composition that while it is rubbed and infiltrated in the pores of the surface, it dries and reacts in the pores of the surface and forms a pore filling that repels the applied hydrophobizing infiltration composition itself.

By the term "spontaneously or quickly self-repelling hydrophobizing infiltration composition" it is meant that the self-repellency is achieved fast, from less than one second up to a few seconds (e.g. 5 seconds), preferably within 1 second, from the moment it is rubbed in the pores of the surface and under the conditions of application of the infiltration composition.

When using a spontaneously or quickly self-repelling hydrophobizing infiltration composition it was surprisingly determined that the infiltration composition already reacts sufficiently when rubbing it in, i.e., when incorporating it, and potential rests or excesses of material, which were formed out of the infiltration composition or derive therefrom, are already removed in this method step, and the tools used, such as, for example, brushes, pads made of nonwoven fabric, felt or foamed material, clean themselves in this respect. The result is a smooth, dry and smudge-free ceramic, artificial or natural stone surface with excellent and improved, extremely high-value surface properties.

As already briefly addressed, the method is carried out preferably in automated form. In this respect, the plates to be treated are transported on a conveying device, such as, for example, a conveyor belt, and the infiltration composition is applied.

The type of application of the infiltration composition is not especially limited and can take place by means of spraying, coating, milling, dropwise application or rolling or also by means of dipping. In this respect, it is important that an as uniform as possible application takes place. This uniform application takes place, for example, by means of distributing the applied lines by means of a distribution satellite or distribution disc, provided with different (polishing) pads, wherein the person skilled in the art of course has also other possibilities of distribution available and he/she is familiar with them. The choice of the pad material is large, such as brushes, non-woven fabrics, foams or felts of different composition and hardness, which can be exchanged depending on the surface, the infiltration composition, and the effect desired to be obtained by the pad.

The application of the infiltration composition basically takes place at a temperature of the surface to be treated in a range of room temperature up to 120° C., preferably of 20° C. to 40° C.

After applying the infiltration composition, it is rubbed in, i.e., it is distributed on the surface and incorporated. Although this can of course also take place manually, for example with manual polishing machines or the already mentioned means, it is preferred to operate in an automated manner and with a polishing device, preferably with a satellite polishing device with several satellite heads or with polishing discs. In this respect, the processing time depends on a combination of a plurality of factors and is optically and empirically determined in general.

In a particular embodiment, the infiltration composition is rubbed in for a period of time of at least one minute, preferably for a period comprised between 1 and 15 minutes.

In a particular embodiment, the rubbing in of the infiltration composition is carried out at a rotation speed of the polishing device of 5-150 rpm.

In a particular embodiment, the rubbing in of the infiltration composition is carried out at a rotation speed of the polishing device of 5-150 rpm and for a period of time comprised between 1 and 15 minutes.

Factors which determine the processing time are essentially ambient and material temperature, air pressure, air moisture and incorporation intensity, wherein the incorporation intensity on a satellite polishing device, for example, is mainly determined by the number of satellites, of satellite heads, the selected contact pressure and the rotation speed as well as the transport speed in the conveying device. Something comparable is also valid correspondingly in transferred form also for devices other than the mentioned satellite polishing device.

In an especially preferred configuration of the method according to the invention the rubbing in takes place in several steps using several polishing satellites and/or polishing discs. This is especially advantageous, because it makes it possible to very finely control the process by adjusting the polishing intensity of the individual satellites and/or polishing discs in a different manner. Thus, the first satellite and/or polishing disc usually operates compared to the following satellites and/or polishing discs with a lower number of revolutions, for example between 7-70 rpm, and lower to medium contact pressure. Of course, the satellites can be equipped with different of the already mentioned polishing pads or tools. Also, a step can be configured or serve to remove a possible excess of material. At the end of the processing operation the ceramic or natural stone surface reaches a temperature in the range of approximately 25° C. to 120° C., preferably from 30° C. to 60° C., due to the generated frictional heat.

In an advantageous configuration of the method according to the invention the steps of applying a hydrophobizing infiltration composition onto the surface to be treated and the subsequent rubbing in until a homogeneous distribution and filling of the pores is achieved are repeated once or several times, since in this way a good penetration depth of the infiltration composition into the substrate and a good filling of the pores is reached. In this respect, especially good results are achieved if these steps are repeated once, twice or three times.

In particular in the event of applying several times the infiltration composition, it has proven to be especially appropriate if the distribution and rubbing in of the infiltration composition takes place under comparatively soft conditions. That means that in this case operation is made with a low to medium compacting pressure, lower rotation speed of the polishing or brushing heads and less temperature increase. The infiltration composition can hereby diffuse into the substrate in an especially good manner and reacts slowly.

Under more stringent conditions of the rubbing in or incorporation of the infiltration composition, among which operation is made with higher contact pressure, higher rotation speed of the polishing or brushing heads and higher temperature increase, an extensive or complete reaction of the infiltration composition takes place quickly, so that it can be advantageous to reach these conditions at the end of this method step.

In the event of ceramic, artificial or natural stone substrate, in particular a hydraulically, inorganically or resin-bound natural stone, quartz, ceramic, glass, and/or artificial stone agglomerate, which is processed in particular in the form of plates, the processed substrate is usually finally removed from the processing section with grippers and is deposited. Also a surprising advantage of the spontaneously or quickly self-repelling hydrophobizing infiltration composition is obtained here, since the conventionally used silicone grippers leave no marks or smears and therefore considerably simplify the method and make it more cost-efficient.

In the event of not spontaneously or not quickly self-repelling hydrophobizing infiltration compositions, operation must be essentially more careful, more delicate and cleaner to avoid marks. Also, polishing pads, or in general polishing means, must be cleaned and/or changed more often, which makes the method more time-consuming and more expensive.

According to the invention, after the step of rubbing in the hydrophobizing infiltrating composition until a homogeneous distribution and filling of the pores in the surface of the ceramic, artificial or natural stone is achieved, a step is envisaged, in which the surface is dried and preferably also blown off and/or polished off, the latter to remove excess of material, for example.

By means of this configuration of the method according to the invention it is possible to free the treated surfaces from adhering dust or rests of material. This configuration of the method according to the invention therefore offers special advantages when the hydrophobizing infiltration composition used has a high percentage of alcohols compared to the contained water, since the infiltration composition is not spontaneously or quickly self-repelling in this case and requires a longer and/or more intensive polishing off to obtain a correspondingly hydrophobic, smooth and, if applicable, glossy surface aspect, wherein this can go along with a slower and more uniform reaction of the hydrophobic infiltration composition, for example.

In an embodiment of the method according to the invention, which is irrespective of the selected and above described configuration, the hydrophobizing infiltration composition comprises one or more from the group consisting of hybrid polymers, alkyl silanes, aryl silanes, aminofunctional silanes, esters of silicic acids, chlorosilanes, organofunctional silanes, fluoroalkylsilanes, silazanes, epoxy- and glycolfunctional silanes, mercaptofunctional silanes, vinylfunctional silanes, isocyanatosilanes, silicone resins, silicone oils, poly-di-$C_{1-6}$-alkyl siloxanes, $C_{8-18}$-alkyl-tri-$C_{1-4}$-alkoxysilanes, wherein the alkyl groups of both preceding compounds are optionally substituted with one or more fluorine atoms, siloxane oligomers, polysiloxane, aminofunctional polysiloxanes, $C_{1-4}$-alkanols and $C_{1-4}$-carboxylic acids. In an embodiment, the composition further comprises water.

In another embodiment, the hydrophobizing infiltration composition comprises one, two or more, or all, from the group consisting poly-di-$C_{1-6}$-alkylsiloxanes, wherein the alkyl groups are optionally substituted with one or more fluorine atoms; $C_{8-18}$-Alkyl-tri-$C_{1-4}$-alkoxysilanes, wherein the alkyl groups are optionally substituted with one or more fluorine atoms; and $C_{1-4}$-carboxylic acids. In an embodiment, the composition further comprises water.

In a preferred embodiment, the hydrophobizing infiltration composition comprises a poly-di-$C_{1-6}$-alkylsiloxane, wherein the alkyl groups are optionally substituted with one or more fluorine atoms; a $C_{8-18}$-Alkyl-tri-$C_{1-4}$-alkoxysilane, wherein the alkyl groups are optionally substituted with one or more fluorine atoms; or a combination of these. In an embodiment, the composition further comprises water.

In another preferred embodiment, the hydrophobizing infiltration composition comprises a $C_{1-4}$-carboxylic acid and one, two or more selected from the group consisting of hybrid polymers, alkyl silanes, aryl silanes, aminofunctional silanes, esters of silicic acids, chlorosilanes, organofunctional silanes, fluoroalkylsilanes, silazanes, epoxy- and glycolfunctional silanes, mercaptofunctional silanes, vinylfunctional silanes, isocyanatosilanes, silicone resins, poly-di-$C_{1-6}$-alkylsiloxanes, $C_{8-18}$-Alkyl-tri-$C_{1-4}$-alkoxysilanes, wherein the alkyl groups of both preceding compounds are optionally substituted with one or more fluorine atoms, siloxane oligomers, polysiloxane, aminofunctional polysiloxanes, and silicone oils. In additional embodiments, the composition further comprises water and/or a $C_{1-4}$-alkanol.

In a more preferred embodiment, the hydrophobizing infiltration composition comprises a $C_{1-4}$-carboxylic acid; and one, two or three selected from the group consisting of poly-di-$C_{1-6}$-alkylsiloxanes, wherein the alkyl groups are optionally substituted with one or more fluorine atoms, and $C_{8-18}$-alkyl-tri-$C_{1-4}$-alkoxysilanes, wherein the alkyl groups are optionally substituted with one or more fluorine atoms. In additional embodiments, the composition further comprises water and/or a $C_{1-4}$-alkanol.

In a more preferred embodiment, the hydrophobizing infiltration composition comprises a $C_{1-4}$-carboxylic acid; and a poly-di-$C_{1-6}$-alkylsiloxane, wherein the alkyl groups are optionally substituted with one or more fluorine atoms, or a $C_{8-18}$-alkyl-tri-$C_{1-4}$-alkoxysilane, wherein the alkyl groups are optionally substituted with one or more fluorine atoms, or a combination thereof. In additional embodiments, the composition further comprises water and/or a $C_{1-4}$-alkanol.

From the above mentioned poly-di-$C_{1-6}$-alkyl siloxanes the polydimethyl siloxanes, polydiethyl siloxanes and silicone oils are preferred due to commercial availability and cost effectiveness reasons; more preferably, the poly-di-$C_{1-6}$-alkyl siloxane is polydimethylsiloxane; more preferably the total amount of poly-di-$C_{1-6}$-alkyl siloxane in the hydrophobizing infiltration composition is 1 to 70%, more preferably 3 to 12% by weight (with respect to the weight of the infiltration composition).

Something comparable is valid for octyltriethoxysilane, dodecafluoroalkyltriethoxysilane, 3,3,4,4,5,5,6,6,7,7,8,8,8-tridecafluorooctyltriethoxysilane and hexadecyltrimethoxysilane, hexadecyltriethoxysilane, and more preferably hexadecyltrimethoxysilane, as a representative of the $C_{8-18}$-alkyl-tri-$C_{1-4}$-alkoxysilane; in a particular embodiment the $C_{8-18}$-alkyl-tri-$C_{1-4}$-alkoxysilane includes hydrolysates and condensates thereof; preferably, the total amount of $C_{8-18}$-alkyl-tri-$C_{1-4}$-alkoxysilane in the hydrophobizing infiltration composition is 0.5 to 30%, more preferably 1 to 8% by weight (with respect to the weight of the infiltration composition).

Methanol, ethanol, propanol and isopropanol, and in particular isopropanol, are preferred as a representative of the alcohols ($C_{1-4}$-alkanols); the total amount of $C_{1-4}$-alkanol in the hydrophobizing infiltration composition can be from 1 to 99.9% (with respect to the weight of the infiltration composition), wherein in the case of spontaneous or quick self-repelling hydrophobizing infiltration compositions the total amount of $C_{1-4}$-alkanol is preferably 0.1 to 25%, more preferably 1 to 10%, even more preferably 3 to 8% by weight, or if the infiltration composition is non-self-repelling hydrophobizing composition, then the total amount of $C_{1-4}$-alkanol is preferably 20 to 99.9% by weight and more preferably 30 to 50% by weight.

Formic acid and acetic acid are preferred as a representative of the $C_{1-4}$-carboxylic acids; preferably the total amount of $C_{1-4}$-carboxylic acid in the hydrophobizing infiltration composition is 0.05 to 0.5% by weight (with respect to the weight of the infiltration composition).

In the event of the latter, the good processing properties also play a role in the method according to the invention.

In a particular embodiment, the hydrophobizing infiltration composition is self-repelling and comprises:
- a poly-di-$C_{1-6}$-alkylsiloxane, preferably polydimethylsiloxane; preferably, the amount of poly-di-$C_{1-6}$-alkylsiloxane is 3 to 12% by weight (with respect to the weight of the infiltration composition);
- a $C_{8-18}$-Alkyl-tri-$C_{1-4}$-alkoxysilane, preferably hexadecyltrimethoxysilane; preferably, the amount of $C_{8-18}$-Alkyl-tri-$C_{1-4}$-alkoxysilane is 1 to 8% by weight (with respect to the weight of the infiltration composition);
- a $C_{1-4}$-alkanol, preferably isopropyl alcohol; preferably, the amount of $C_{1-4}$-alkanol is 3 to 8% by weight (with respect to the weight of the infiltration composition);
- a $C_{1-4}$-carboxylic acid, preferably acetic acid; preferably the total amount of $C_{1-4}$-carboxylic acid is 0.05 to 0.5% by weight (with respect to the weight of the infiltration composition); and/or
- an aminofunctional polysiloxane; preferably, the amount of aminofunctional polysiloxane is 0.05 to 0.5% by weight (with respect to the weight of the infiltration composition).

In another particular embodiment, the hydrophobizing infiltration composition is not self-repelling and comprises:
- a poly-di-$C_{1-6}$-alkylsiloxane, preferably polydimethylsiloxane;
- a $C_{8-18}$-Alkyl-tri-$C_{1-4}$-alkoxysilane, preferably hexadecyltrimethoxysilane;
- a siloxane oligomer;
- a $C_{1-4}$-alkanol, preferably isopropyl alcohol; and/or
- an aminofunctional polysiloxane.

In a particularly preferred embodiment, in any of the embodiments described herein, the infiltration composition is used as an aqueous solution or suspension. In an embodiment the infiltration composition comprises between 5% and 95% water, or between 50 and 90% water.

It is to be understood that in specific infiltration compositions the amount of all components adds up to 100% of the weight of the infiltration composition.

In contrast to the other mentioned compounds, the abovementioned hybrid polymers, polymeric structures with mixed inorganic-organic proportions, are generated in situ in the infiltration composition by means of a partial reaction of the components. In this respect, the hybrid polymers are still reactive and are converted (build up their structure) in the course of the method (especially during drying) forming a glass-like mass and/or bond to the material to be coated. In a particular embodiment, the hybrid polymer is an inorganic-organic silicon-containing polymer.

During the development of the infiltration composition it was surprisingly discovered that the resulting infiltration composition is spontaneously or quickly self-repelling hydrophobizing, when the percentage of alcohol contained is in the range of 0 to 25% by weight, preferably at 1-10% by weight. The alcohol contained in the described percentages by weight helps with the penetration and can volatilize easily.

A general composition of such a spontaneously or quickly self-repelling hydrophobizing infiltration composition contains, for example, 3 to 12% by weight polyalkylsiloxane, 3 to 8% by weight alcohol, 1 to 8% by weight alkyltrialkoxysilane, 0.05 to 0.5% by weight aminofunctional polysiloxane, 0.05 to 0.5% by weight carboxylic acid and 50 to 90% by weight water.

This general infiltration composition can furthermore be adapted to certain requirements with respect to the intended surface properties or the substrate used. This occurs as a general rule by adding one or more of the compounds disclosed herein in amounts, which are in general between 0.1 and 5% by weight, wherein the water percentage is usually reduced correspondingly.

In this context the addition of 3,3,4,4,5,5,6,6,7,7,8,8,8-tridecafluorooctyltriethoxysilane in an amount in the range of 0.05 to 4% by weight for an extremely improved dirt-repellent finish can be exemplarily mentioned. The compounds set forth below in table form under Example 4—Functionalization also belong to these compounds.

It is assumed that the spontaneous or quick self-repellency of such a composition is motivated by the wetting properties of the alcohol, since such a low percentage of alcohol in the infiltration composition already enables very quickly a hydrophobization of the surface due to the quick volatilization. Excess of material can hereby be easily blown away from the surface to be coated and need not be removed by means of many polishing steps in a complex manner. This is especially important, since to completely fill the pores it is necessary to operate with an excess of material and the material is constantly blown under the distribution satellites, which leads to a lower material consumption and thus increases the cost effectiveness, in particular when material is repeatedly blown in the direction of the penetration satellite (satellite where most of the infiltration takes place) or in the direction of another distribution satellite with the blowing device, which material can in turn be repeatedly driven into the pores.

In contrast, a non-self-repelling hydrophobizing or self-attractive infiltration composition (this is, infiltration composition which after infiltration and reaction into the pores of the surface does not repel the liquid infiltration composition itself, and even attracts it) preferably has an alcohol percentage from 20 to 99.9% by weight, preferably 30 to 50% by weight in the infiltration composition, wherein the wetting properties of the alcohol provide a good wettability and good penetration of the reaction products generated from the long-chain polymeric products (e.g. hexadecyltrimethoxysilane and its hydrolysates and condensates) into the substrate.

A general composition of a self-attractive or not spontaneously or not quickly self-repelling hydrophobizing infiltration composition comprises 30 to 40% by weight alcohol, 3 to 9% by weight polyalkylsiloxane, 1 to 3% by weight alkyltrialkoxysilane, 0.05 to 0.5% by weight aminofunctional polysiloxane and 47.7 to 64.95% by weight siloxane oligomer.

The advantage of the spontaneously or quickly self-repelling hydrophobizing infiltration compositions with respect to the self-attractive infiltration compositions consists in that hereby a very uniform infiltration profile of the slab can be produced, which simplifies the processing and especially in the event of large slabs could not be virtually achieved or only with very high effort from the method engineering point of view until now. During the infiltration process, self-attractive and thereby not spontaneously self-repelling hydrophobic infiltration compositions can moreover lead to non-uniform bathochromic shifts (i.e. non-uniform surface appearance) in the resulting product, wherein the origin thereof is that the pads attached to the distribution device show more intensive wear at some points, such as, for example, edges.

Alternatively, although less preferred, the self-repelling hydrophobizing infiltration composition may be a spontaneously or quickly self-repelling composition comprising fluorinated silanes in an organic solvent instead of water. In this case, after infiltration and reaction into the pores, the composition in the pores repels the liquid hydrophobizing infiltration composition itself by oleophobic effect.

Furthermore, in the event of not spontaneously or quickly self-repelling hydrophobizing, at points in which the pads quite often swing over the surface, such as, for example, in the center of the plate, more intensive bathochromic shifts are generated by means of a higher material input into the pores, since a moist pad releases material, and where the pad passes more often the pores are more intensively filled and closed and thus bathochromically shifted.

When employing or using spontaneously or quickly self-repelling hydrophobizing infiltration compositions, rolling off droplets of the infiltration material are blown in the direction of the "penetration" satellite, wherein the pads can also become repellent against the infiltration composition and thereby always have a self-cleaning property. Hence, they absorb almost no material to no material and provide an at least more uniform, but as a general rule a uniform, bathochromic shift. This is also resource-saving and cost-effective, since it is assured that at each point there is available a uniform amount of material for penetration and is incorporated into the pores.

Therefore, by means of a corresponding adjustment of the alcohol percentage of the infiltration composition the processing properties of the infiltration composition can be advantageously controlled in multiple manners. This relates both to the processing speed, and for example to the adaptation to the surface to be coated.

If in such hydrophobizing infiltration compositions fluorinated or multi-fluorinated silanes are moreover used, then infiltration compositions are obtained, which are interesting for certain fields of application and lead as a result to especially dirt-repellent products, for example.

Furthermore, self-repelling hydrophobizing infiltration materials formulated with fluorinated or multi-fluorinated silanes can thus be produced, in which in turn the excess of coating material, which cannot initially penetrate the substrate anymore, is continuously blown with a blowing device in the direction of the penetration satellite, whereby a continuous re-filling of the pores is achieved. If the pore is completely filled, the excess of material is blown from the slab/the tile, so that also in this case a self-cleaning of the polishing tools and of the surface of the substrate takes place.

In a further, especially interesting, independent alternative of the method according to the invention, the infiltration composition comprises one or more compounds from the group consisting of $SiO_2$, $Al_2O_3$, BN, $B_2O_3$, SiC, SiN, $TiO_2$ and $Zr_2O_3$, which enables a further modification of the surface properties of the resulting product.

The use of these compounds leads in general to a better filling of the pores basically present in the surfaces to be treated, which essentially leads, unless these compounds are used in a form with particle sizes which are somewhat over the average pore diameter, to a smoothing of the surfaces of the resulting product. The result herefrom is a sealing of the surfaces with respect to diffusion operations, an increase of the mechanical resistance, a better chemical resistance and also leads, due to the reactivity of these compounds in the infiltration composition, to quicker production processes.

In a comparable manner, the surfaces of the resulting product or of the resulting products can be designed according to the invention in a very simple manner as highly glossy, matt, satined, lapped, antibacterial, anti-moss, scratch-resistant, scratch-proof, abrasion-proof, slip-resistant, stain-resistant, resistant to chemicals, footprint-resistant, photocatalytic, antistatic, electrically conductive, heat-reflecting and/or heat-absorbing surfaces, by means of the suitable addition of corresponding compounds. As examples in this context silver, copper or tin compounds for antimicrobial properties, also antibacterial and antiviral properties, as well as an anti-moss effect, can be mentioned. By using certain modifications of $TiO_2$, photocatalytic properties and the like are achieved.

Further advantages induced by means of the method according to the invention such as, for example, a better fixation of pigments, in particular in hydraulically or resin-bound natural stone and/or quartz agglomerates, increase of the surface hardness and the like are described in further detail below in connection with further configurations of the method according to the invention.

The improvement of the surface properties and in this respect in particular the increase of the surface hardness, which can be measured as scratch resistance, and also of the surface smoothness is based on the deep penetration of the infiltration composition into the surface to be treated and the subsequent reaction of the reactive components of the infiltration composition. In addition to the simple filling of the open or opened pores present in the surface, the infiltration composition penetrates into interstices on a molecular level and forms during reaction reactively bonded tridimensional grid structures, which are additional to the structures already present in the starting substrate. According to the invention, the material density is consequently increased on a molecular level correspondingly to the penetration depth of the infiltration composition. This increase of the packing density leads to a better support of molecular cavities by configuring tridimensional scaffold or grid structures, and consequently stabilizes the same and finally leads to an increase of the surface hardness and scratch resistance.

In this respect, the reactive bonding and/or the better space filling moreover provides for the pigments to be better fixed in pigmented substrates and consequently a washing out and/or bleaching out by means of, for example, harsh cleaning agents such as chlorine bleaches is strongly reduced or completely avoided.

This special effect is surprisingly discovered with the present invention and has been made available for the first time in a targeted manner.

In this context, the result is also casually that reiterated repetitions of the application and rubbing in, preferably repeating once, twice or three times, increase said effects in an advantageous manner, since the reactive components contained in the infiltration composition may not be sufficient in the first application for a complete filling of the interstices on a molecular level. When correspondingly repeating the application and rubbing in, these remaining cavities are also filled more and more, and more and more an increase of the surface hardness and other surface properties takes place.

Irrespective of the already described configurations of the method according to the invention, in a further, especially advantageous improvement thereof it is furthermore envisaged, before applying the infiltration composition, to apply a colloidal silica sol or water glass.

In the context of the present invention, a sol refers to a suspension, i.e., mixture of a liquid (the continuous phase, typically water) and a solid phase (the dispersed phase), where the solid phase is comprised of silica particles and/or aggregated silica particles.

The silica sol might contain, for example, amorphous $SiO_2$ or colloidal silicon dioxide.

The term water glass refers to soluble (preferably soluble in water) alkaline silicates. Examples of water glasses are sodium or potassium silicates.

The silica sol or water glass is added to the ceramic, artificial or natural stone surface to be coated, proceeding in a comparable manner as when applying the infiltration composition. I.e., a silica sol or water glass is first applied, which is followed by a rubbing in until a wet, homogeneous layer starts to form on the surface. Since the application and the processing of the silica sol or water glass takes place in a wet state, the treated surface is then first dried and subsequently an excess of material usually present is polished off.

In this context it must be noted that in this sense it is preferably proceeded so that operation is made with an excess of silica sol or water glass material. This leads to an overfilling of the pores and rests of material remaining on the surface of the substrate. After drying, this excess of material is polished off in a completely flush manner, whereby an especially good smoothing of the surface takes place. Moreover, the material rests coming from the silica sol or the water glass are advantageously integrated in the surface structure in the following method step, in which a hydrophobizing infiltration composition is applied.

In fact, the same is true for the hydrophobizing infiltration composition in the subsequent stages of the method of the invention, i.e. it is preferably proceeded so that operation is made with an excess hydrophobizing infiltration composition. This leads to an overfilling of the pores and rests of hydrophobizing infiltration composition material remaining on the surface of the substrate. After drying, this excess of material is polished off, preferably in a completely flush manner.

In this sense, basically commercially available silica sols, which can be commercially obtained, for example, under the trade names Levasil® and KöStrosol®, can be used in the method according to the invention in the commercially available concentrations, individually or in combination thereof. Some modified silica sol compositions have proven to be especially advantageous in the context of the method according to the invention and are explained in further detail in the examples, it being however necessary to highlight that already commercially available silica sols provide excellent results.

A further possibility lies in using water glass compounds instead of colloidal silica sol, which similarly leads to comparable results.

The special advantage of this improvement of the method according to the invention lies in that it is possible to even more strongly influence and improve the properties of the material surface to be treated, i.e., the ceramic, artificial or natural stone surface to be coated and in particular the surface of hydraulically or resin-bound natural stone, ceramic, glass, and/or quartz agglomerates. This applies to virtually all the already discussed surface properties and it is assumed that it can be attributed to the filling of the pores present in the material surface, which will be described in further detail below. At the same time, the surface modifications already described in connection with the hydrophobizing infiltration composition can also be similarly achieved at least partially, i.e. by adding the corresponding, modifying compounds to the silica sol or water glass. The thus intended surface modifications are at least supported and/or reinforced. This applies especially to the compounds already mentioned in connection with the infiltration composition, so that these compounds can also be used without restrictions in these upstream method steps for the same purposes without restrictions.

In this respect, it is preferred that the colloidal silica sol used contains amorphous $SiO_2$ with a particle size of 0.1 to 500 nm, preferably 0.1 to 150 nm, more preferably a mean particle size $D_{50}$ from 5 to 50 nm, in particular 7-20 nm, and is preferably anionically or cationically stabilized (stabilization to obtain a stable colloid which does not separate) and the colloidal silica sol is optionally modified with acids, bases, catalysts, polysiloxane, organopolysiloxane, siloxane, silane and/or epoxysilane, since thus a good filling of pores in the material surface is achieved, in addition to an extremely good bond between the silica sol and the surface of the pores.

Cationically or neutrally stabilized silica sols have shown to be especially advantageous according to the newest findings, the silica sols not having been used on their own in the past for the purposes described in the present invention, as well as also anionic, acidic or alkaline silica sols, which have not been used in the context according to the invention alone as a pore filling which is resistant to staining, and after filling the pores they had to be infiltrated with a dirt-repellent infiltration solution or dispersion to achieve the resistance to staining.

In anionic, acidic or alkaline colloidal silica sols it is possible to incorporate hydrophobizing silanes, siloxanes, silicone oils, hybrid polymers etc. only with great difficulty, whereby a dirt-repellent effect was achievable only with great difficulty or partially.

These are now able to configure, with only one application, an $SiO_2$ scaffold in the form of a dense packing and at the same time achieve a strong dirt-repelling effect, which could not be implemented until now.

The $SiO_2$ contained in the silica sol, the same applies for the compounds optionally contained in the silica sol, such as, for example $Al_2O_3$, $TiO_2$ and $Zr_2O_3$, acts in the bond to the surface (the bond between the silica sol and the pore surface) to be coated as an adhesion and reaction bridge and results in an especially firm bond. A direct consequence is, at least in resin-bound natural stone and quartz, ceramic, glass agglomerates, a more uniform absorptive capacity of the hydrophobizing infiltration composition by the surface. This is especially advantageous for the subsequent coating with the hydrophobizing infiltration composition.

In addition, the silica sol, or even better the generated siliceous network, does not disappear in the pore and thus also provides for a better residual filling with the infiltration composition, which has a positive effect on the resulting surface smoothness and surface hardness, just to mention two improved properties.

The surface smoothness, and if desired also the degree of gloss, can then be further improved again by means of a flush abrasion of the surface. In this context, it must be expressly highlighted that it is essential for the invention that a filling of the pores present in the surface of the respective substrate takes place, since the infiltration composition and, if applicable, also the silica sol or water glass can be driven into the pores, and as a result no overlying layer or stratum is formed.

This is especially advantageous, because layer or stratum systems have in general a reduced mechanical stability, whereas according to the invention cross-linkings take place in the substrate, i.e., in the pores of the substrate. Delamination of the overlying layer, the undercutting of this layer by dirt, and the penetration of dirt into the pores and or between the surface and the layer associated therewith, for example, by means of scratching, is excluded according to the invention.

The silica sol, which is ideally configured in a hydrophilic manner, also suctions the infiltration composition deeper into the material to be coated and thus reinforces the hydrophobization of the surface, which results in the formation of tridimensional scaffolds and makes the surfaces essentially more abrasion-resistant, harder and more chemically resistant. Consequently, a combination of silica sol application and subsequent application of an infiltration composition has a synergistic effect in the sense of the invention. I.e. the intended improvements of the surface properties are thus achieved in an especially good manner.

However, if the silica sol is configured less hydrophilic and more hydrophobic, this results in an especially dirt-repellent product. In such cases, the use of the hydrophobizing infiltration composition can even be omitted. The hereby obtained products are indeed not of such a high value in all surface properties, such as, for example, the optical properties, but are nevertheless still advantageous with respect to the improved surface hardness and the like, so that qualitatively high-valuable products are obtained in a cost-effective manner, which are, for example, especially well suitable for an industrial application.

It must be further highlighted that the firm integration of the silica sol, which at least partially also applies to the infiltration composition, and by configuring a stable matrix the pigments contained in the material to be coated are bonded in a better way and are thus better protected from being dissolved away or other color-changing influences.

Advantageously, in the method according to the invention it is possible to also control the diffusion depth and thus the penetration of the uppermost layer of the material to be coated by means of the corresponding selection, in particular of the temperature parameters.

In the method steps of rubbing in and polishing, this applies both with respect to the infiltration composition and with respect to the silica sol and the water glass, the diffusion in the material to be coated is intensified by increasing the temperature, a first application of silica sol or water glass also acting reinforcing the diffusion.

In this respect, a temperature increase can be effected and controlled by heating the material to be coated by means of external heat sources, by means of the reaction heat being released, for example, in the event of a first application of silica sol, or by means of the frictional heat generated during rubbing in and polishing.

The described temperature increase can basically take place in a wide range. The surface of the material to be treated can be heated up to obtain an increase in temperature between 5° C. and 120° C. Since a temperature increase has direct effects on the reaction speed, a corresponding adjustment or a correspondingly selected temperature regime enables further possibilities for a fine control of the method according to the invention. For more gentle conditions and a slower, more uniform reaction, a reduced warming is in general preferred, the surface of the material to be treated being heated up to increase the temperature between 0° C. and 30° C., more preferably between 0° C. and 10° C., whereas more stringent conditions with higher reaction speed are preferably achieved with a temperature increase of the surface of the material to be treated to a temperature increase of up to from 30° C. to 120° C., more preferably of up to from 50° C. to 80° C.

Both in the infiltration composition and in the silica sol is it possible to carry out further, advantageous modifications, which take place in particular adapting to the nature and the type of the surface to be coated.

In this regard, on one hand, the adjustment of the pH value of the infiltration composition and/or of the silica sol can be mentioned, so that the surface to be coated is etched and/or activated and thus becomes more reactive. On the other hand, the use of reaction starters or of catalysts, which on one hand accelerate the reaction, but also on the other hand at least enable or improve a reaction with the binding agents contained in the agglomerates, in particular with resins, pigments and fillers, wherein it is possible to exemplarily mention dibutyltin dilaurate, dimethyltin dilaurate, organometallic compounds, Lewis acid-catalysts, Lewis base-catalysts, acids, bases, tertiary aminocompounds, alkylmercaptide-compounds as well as tin, zinc, iron, lead, cobalt, bismuth, antimony, electrophilic and nucleophilic organic compounds, and in particular the compounds or mixtures thereof.

Furthermore, the particle size of the particles contained in the infiltration composition and/or silica sol can be adjusted preferably depending on the pore size and/or the pore size distribution of the surface to be coated, in order to fill the pores as much as possible forming a dense packing.

In summary, it can be determined that the present invention advantageously enables for the first time to infiltrate great plates or slabs, which are in part clearly greater than tiles of 30×30 cm, for example, with an edge length of 2 or 3 m, and to refine the surface thereof as described, without defects in the optical appearance being formed, such as bathochromic shifts and/or the formation of so-called halos or whitish shadings. It is hereby enabled to obtain great, uniform and interruption-free or seam-free surfaces, which can be employed in the most different fields, thus, for example, as kitchen countertops or façade panels and floor plates.

Furthermore, it is especially important that the hydrophobic finish according to the invention of the ceramic, artificial or natural stone surface, in contrast to the state of the art, has a very high resistance (e.g. against staining agents, against abrasion, against chemical attack) due to the reactive bonding to the substrate, which also relates in particular to the resistance to chemicals. A ceramic, artificial or natural stone surface treated according to the invention, for example, also with chlorine bleaches, is thus attacked, if at all, only in a small degree.

Although the invention and advantageous configurations and improvements as well as at least part of the obtained advantages were described in general above, the invention is explained in further detail below by means of embodiments and making reference to the attached drawings, the data in % referring to the percentage by weight of the entire composition, unless otherwise indicated.

FIGS. 5A to 9B show electron microscope images of a uncoated surface of a commercial Silestone® artificial stone according to the state of the art and of a Silestone® surface which was obtained according to the method according to the invention after a scratch test compared in different resolution

To evaluate the chemical resistance and/or staining resistance of these treated and untreated artificial stone materials, 0.1 mL of different staining or chemical agents were poured onto the surface of the material, and each agent was left for 24 hours. Afterwards, the agents were thoroughly cleaned with water and the effect on the surface was visually evaluated using a scale between 0 (no effect) and 4 (strong effect) (the lower, the better).

Nine different selected agents (including acid and basic substances) were used to evaluate the chemical resistance. The sum of the visual evaluation of all agents scored 5 in the case of the surface treated with silica sol only (without self-repelling hydrophobizing infiltrating composition) and it scored in the case of treatment with silica sol and the self-repelling hydrophobizing infiltration composition of Example 1.

In case of the stain test resistance, the sum of the visual evaluation from treatment with 6 different selected agents (with different particle size and colors), scored 4 in the case of the surface treated with silica sol only (without self-repelling hydrophobizing infiltrating composition) and it scored 1 in the case of treatment with silica sol and the self-repelling hydrophobizing infiltration composition of Example 1.

FIGS. 5 to 9B show comparisons of the results of a scratch test, FIGS. 5A, 6A, 7A, 8A and 9A depicting a commercial Silestone® artificial stone surface without coating according to the state of the art in different resolutions, and FIGS. 5B, 6B, 7B, 8B and 9B showing a commercial Silestone artificial stone surface treated following the method according to the invention (specifically treatment with a silica sol (Köstrosol K 1530) and with the composition described below in Example 1) after the test. The tests have been identically carried out apart from the respective test object and it is apparent that the surface treated following the method according to the invention shows a higher scratch resistance and is therefore also harder.

Abrasion tests in dry and wet conditions were performed using a scouring pad and a weight equivalent applied force of 1 Kg for 250 back-and-forth cycles. The wetting agent for the wet conditions was tap water. The effect of the abrasion after the 250 cycles was evaluated by measuring the brightness with a PCE-SGM 60 brightness tester before and after the test at 10 different points in the abraded area. The average brightness loss is an indication of the resistance to abrasion of the surface, the lower the loss, the higher the resistance. The average brightness loss in the case of uncoated Silestone® surface was 5.1 (dry conditions) and 2.7 (wet conditions). In comparison, average brightness loss of the Silestone® surface treated according to the invention with silica sol and the self-repelling hydrophobizing infiltration composition of Example 1 was 0.9 (dry conditions) and 0.4 (wet conditions), much lower and therefore more resistant to abrasion than the untreated surface.

Figure 1A:
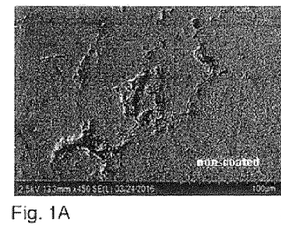
FIGS. 1A-C show 3 electron microscope images of a non-coated surface of a Silestone® artificial stone from a resin-bound quartz agglomerate in different resolution
Figure 1B:
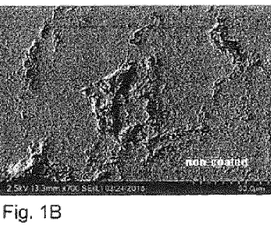
Figure 1C:
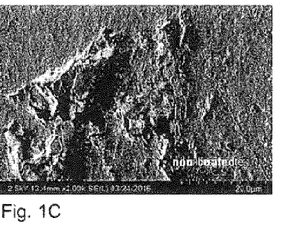
Figure 2A:
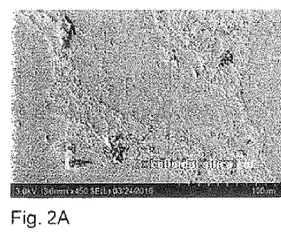
FIGS. 2A-C show 3 electron microscope images of the same surface with a coating with colloidal silica sol (Köstrosol K 1530) in different resolution
Figure 2B:
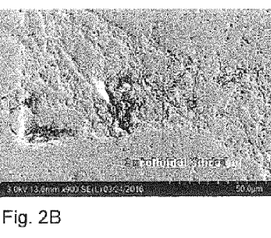
Figure 2C:
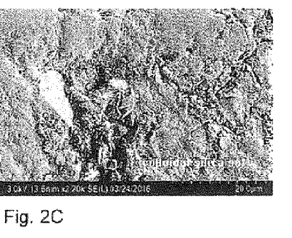
Figure 3A:
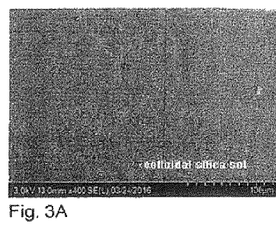
FIGS. 3A-C show 3 electron microscope images of the surface from FIG. 1 with double coating with colloidal silica sol (Köstrosol K 1530) in different resolution
Figure 3B:
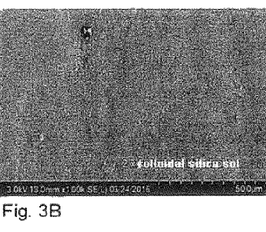
Figure 3C:
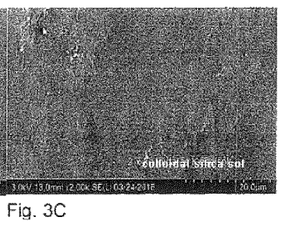
Figure 4A:
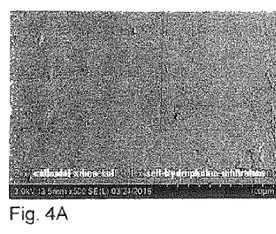
FIGS. 4A-C show 3 electron microscope images of the surface from FIG. 1 with double coating with colloidal silica sol (Köstrosol K 1530) and self-repelling hydrophobizing infiltration composition of Example 1
Figure 4B:
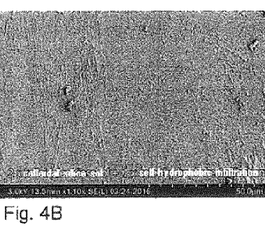
Figure 4C:
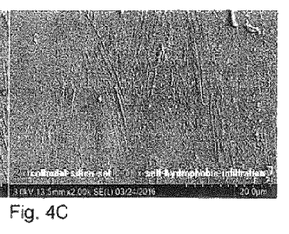
Figure 5A:
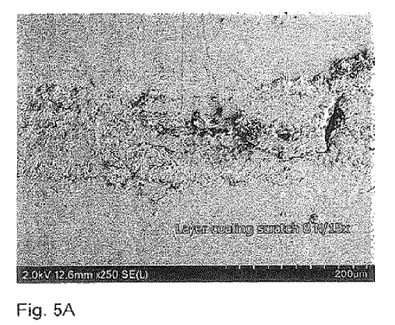
Figure 5B:
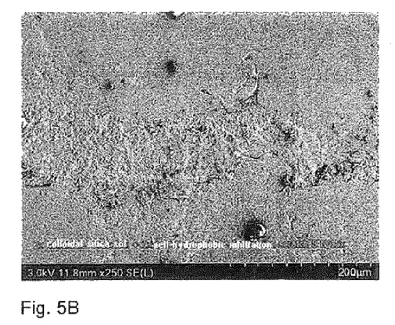
Figure 6A:
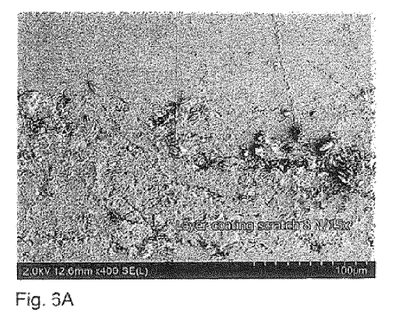
Figure 6B:
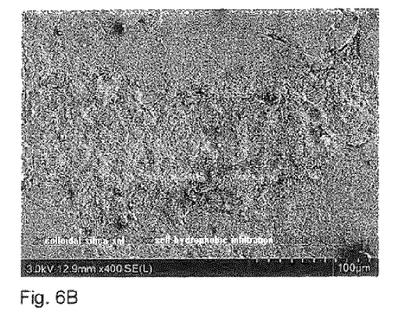
Figure 7A:
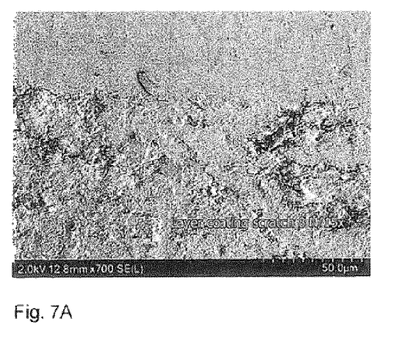
Figure 7B:
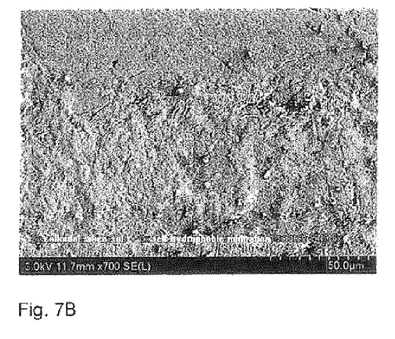
Figure 8A:
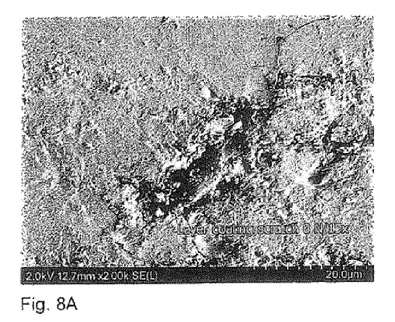
Figure 8B:
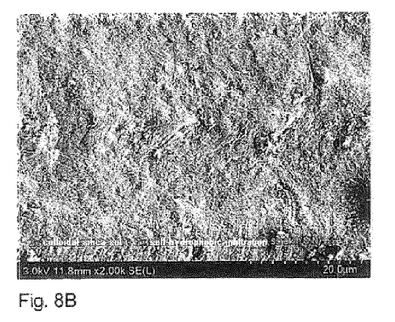
Figure 9A:
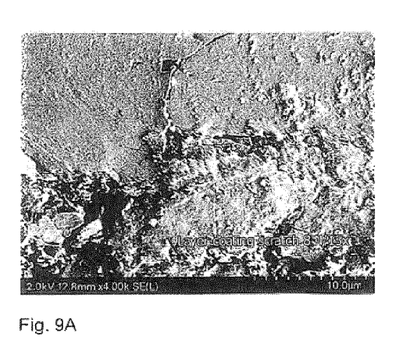
Figure 9B:
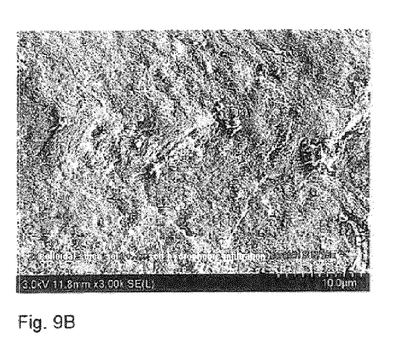
Figure 10:
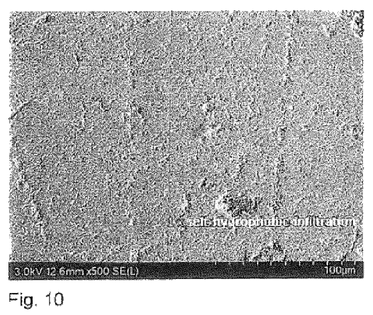
FIGS. 10 to 12 show electron microscope images of a surface of a commercial Silestone® artificial stone from a resin-bound quartz agglomerate in different resolution treated according to the method of the invention In detail, it can be clearly deduced from FIGS. 1A-C to 4A-C, that the surface of commercial Silestone® artificial stone (commercialized by the Spanish company Cosentino) is clearly smoothened by means of the silica sol (Köstrosol K 1530 from the German company CWK) application and also the final treatment with a self-repelling hydrophobizing infiltration composition (specifically that of Example 1 described below) does not markedly decrease the smoothness of the surface. It must be noted for this purpose, that the hydrophobization of the surface provides in particular for a better soiling behavior and an increase of the resistance to chemicals.
Figure 10A:
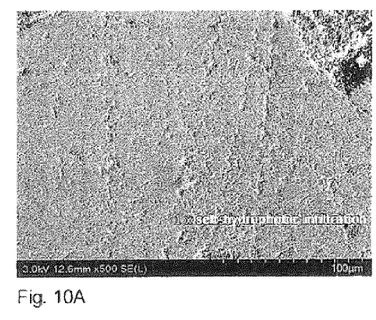
Figure 11:
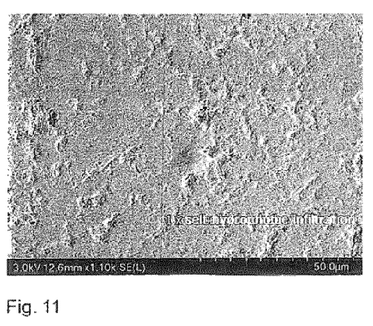
Figure 12:
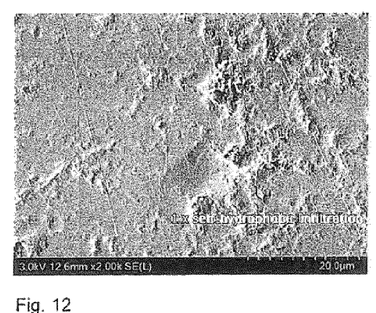

FIGS. 10 to 12 show finally electron microscope images in different resolution of a surface of an artificial stone from a resin-bound quartz agglomerate treated with the self-repelling hydrophobizing infiltration composition according to the present invention (specifically with the composition described below in Example 1). The images prove an excellent increase of the surface smoothness, without it being necessary to previously apply a colloidal silica sol. However, previous application of a silica sol is advantageous in the case in which the surface to be treated has comparatively big pores, since these cannot be completely filled and smoothened by means of a single application of a hydrophobizing infiltration composition. This is in particular apparent from FIG. 10A, in which such a pore can be clearly seen in the upper right corner.

EXAMPLE 1—SELF-REPELLING HYDROPHOBIC INFILTRATION COMPOSITION

| | |
|---|---|
| Polydimethylsiloxane $((CH_3)_2SiO)_n$ | 7.8% |
| $H_2O$ | 85% |
| Acetic acid $CH_3COOH$ | 0.1% |
| Isopropyl alcohol $C_3H_8O$ | 5% |
| Hexadecyltrimethoxysilane $(C_{19}H_{42}O_3Si)$ | 2% |
| Aminofunctional polysiloxane | 0.1% |

EXAMPLE 2—NON-SELF-REPELLING HYDROPHOBIZING INFILTRATION COMPOSITION

| | |
|---|---|
| Isopropyl alcohol $C_3H_8O$ | 34.9% |
| Siloxane oligomer | 58% |
| Hexadecyltrimethoxysilane $(C_{19}H_{42}O_3Si)$ | 2% |
| Polyalkylsiloxane | 5% |
| Aminofunctional polysiloxane | 0.1% |

EXAMPLE 3—SILICA SOL

The silica sols used according to the invention are basically not especially limited and are in general commercially offered in different qualities and with different solid content. The particle size of the silica sols used basically complies with the size of the pores in the surface to be treated. In general, the silica sols used can therefore contain solids with a mean diameter from 0.1 nm to 500 nm.

Silica sols can be used in the usually offered concentrations and they are in general in the range from 1% to 60%. It is preferred to use anionically stabilizing silica sols in the method according to the invention, but it being also possible to use cationically stabilizing and or neutral, acidic, alkaline silica sols.

Depending on the substrate to be treated and the intended result it is also possible to use modified silica sols, such as, for example, silane-modified silica sols. In this respect, the silane percentage can vary strongly with respect to the silica sol and is basically in the range of 1:99 (silane:silica sol) to 5:1.

In addition, it is possible to increase the reactivity of the silica sols used by shifting the pH value by means of the suitable addition of acids and bases. Also in this case, variation in a wide range is possible, in general by adding from 10% to 80% of 3% KOH to the silica sol. The addition of 5% to 60% of a 5% KOH has proven to be especially advantageous, since the reaction of the silica sol in this range takes place quickly and especially uniform in a corresponding manner.

Examples of the surface functionality of silica sol particles, also in modified form, are exemplarily depicted and explained in the following formulae 1 to 3:

Formula 1

The silica sol depicted in Formula 1 is a usually used silica sol, which is conventionally anionically stabilized with ammonia, KOH and/or NaOH.

Formula 2

Formula 2 depicts a silica sol modified with aluminum, which is also conventionally anionically stabilized with ammonia, KOH and/or NaOH.

Formula 3

The silane-modified silica sol according to formula 3 is usually also basically stabilized with ammonia, KOH and/or NaOH.

However, the silica sols used are not limited to the above described silica sols. Other modifications are also easily possible and the person skilled in the art is familiar with them. In general a plurality of metal oxides can be used in the context of the present invention for such a modification. For example, titanium, zirconium and boron oxides.

The following examples are compositions of cationically and neutrally stabilized silica sols, which have proven to be especially advantageous in the context of the present invention. Köstrosol K 1530 is a trade name for colloid-disperse solutions of $SiO_2$ in water with an average particle size of 5-80 nm and a concentration of 30%, which are cationically stabilized, whereas Levasil CC 301 and Levasil CC 401 are neutral silica sols in a concentration of 30 or 40%:

EXAMPLE 3.1A CATIONICALLY STABILIZED SILICA SOL

| | |
|---|---|
| Octamethylcyclotetrasiloxane | 0.04% |
| Aminoalkylfunctional polysiloxane | 2% |
| Methoxyterminated poly[3-((2-aminoethyl)amino)propyl]methyl(dimethyl)siloxane | 1% |
| Branched tridecanol ethoxylate | 1% |
| $H_2O$ | 16% |
| Köstrosol K1530 | 80% |

EXAMPLE 3.1B CATIONICALLY STABILIZED SILICA SOL

| | |
|---|---|
| Octamethylcyclotetrasiloxane | 0.02% |
| Aminoalkylfunctional polysiloxane | 1% |
| Methoxyterminated poly[3-((2-aminoethyl)amino)propyl]methyl(dimethyl)siloxane | 0.5% |
| Branched tridecanol ethoxylate | 0.5% |
| Kostrosol K1530 | 80% |
| Hexadecyltrimethylammonium chloride | 0.1% |
| 3-Aminopropyltriethoxysilane | 0.05% |
| 2-Bromo-2-nitropropane-1,3-diol | 0.01% |
| $H_2O$ | 17.82% |

EXAMPLE 3.2 CATIONICALLY STABILIZED SILICA SOL

| | |
|---|---|
| Hexadecyltrimethylammonium chloride | 0.2% |
| 3-Aminopropyltriethoxysilane | 0.1% |
| 2-Bromo-2-nitropropane-1,3-diol | 0.02% |
| H$_2$O | 19.68% |
| Köstrosol K1530 | 80% |

EXAMPLE 3.3 CATIONICALLY STABILIZED SILICA SOL

| | |
|---|---|
| Oxirane, phenyl-polymer with oxirane-mono(3,5,5-trimethylhexyl)ether | 2.0% |
| Alkyldimethylbenzylammonium chloride | 0.2% |
| H$_2$O | 17.8% |
| Köstrosol K1530 | 80% |

EXAMPLE 3.4 CATIONICALLY STABILIZED SILICA SOL

| | |
|---|---|
| Triethoxy(2,4,4-trimethylpentyl)silane | 6.0% |
| α-iso-Tridecyl-omega-hydroxy-polyglycol ether | 0.15% |
| H$_2$O | 13.85% |
| Köstrosol K1530 | 80% |

EXAMPLE 3.5 CATIONICALLY STABILIZED SILICA SOL

| | |
|---|---|
| 3,3,4,4,5,5,6,6,7,7,8,8,8-Tridecafluorooctyltriethoxysilane | 0.2% |
| Octadecyltriethoxysilane | 1.5% |
| Triethoxy(2,4,4-trimethylpentyl)silane | 3.0% |
| α-iso-Tridecyl-omega-hydroxy-polyglycol ether | 0.55% |
| H$_2$O | 14.75% |
| Köstrosol K1530 | 80% |

EXAMPLE 3.6 NEUTRAL SILICA SOL

| | |
|---|---|
| Octamethylcyclotetrasiloxane | 0.04% |
| Aminoalkylfunctional polysiloxane | 2% |
| Methoxyterminated poly[3-((2-aminoethyl)amino)propyl]methyl(dimethyl)siloxane | 1% |

EXAMPLE 3.11 NEUTRAL STABILIZED SILICA SOL

| | |
|---|---|
| Octamethylcyclotetrasiloxane | 0.02% |
| Aminoalkylfunctional polysiloxane | 1% |
| Methoxyterminated poly[3-((2-aminoethyl)amino)propyl]methyl(dimethyl)siloxane | 0.5% |
| Branched tridecanol ethoxylate | 0.5% |
| Levasil CC 301 | 40% |
| Levasil CC 401 | 40% |
| Hexadecyltrimethylammonium chloride | 0.1% |
| 3-Aminopropyltriethoxysilane | 0.05% |
| 2-Bromo-2-nitropropan-1,3-diol | 0.01% |
| H$_2$O | 17.82% |
| Branched tridecanol ethoxylate | 1% |
| H$_2$O | 16% |
| Levasil CC 301 | 40% |
| Levasil CC 401 | 40% |

EXAMPLE 3.7 NEUTRAL SILICA SOL

| | |
|---|---|
| Hexadecyltrimethylammonium chloride | 0.2% |
| 3-Aminopropyltriethoxysilane | 0.1% |
| 2-Bromo-2-nitropropan-1,3-diol | 0.02% |
| H$_2$O | 19.68% |
| Levasil CC 301 | 40% |
| Levasil CC 401 | 40% |

EXAMPLE 3.8 NEUTRAL SILICA SOL

| | |
|---|---|
| Oxirane, phenyl-polymer with oxirane-mono(3,5,5-trimethylhexyl)ether | 2.0% |
| Alkyldimethylbenzylammonium chloride | 0.2% |
| H$_2$O | 17.8% |
| Levasil CC 301 | 40% |
| Levasil CC 401 | 40% |

EXAMPLE 3.9 NEUTRAL SILICA SOL

| | |
|---|---|
| Triethoxy(2,4,4-trimethylpentyl)silane | 6.0% |
| α-iso-Tridecyl-omega-hydroxy-polyglycol ether | 0.15% |
| H$_2$O | 13.85% |
| Levasil CC 301 | 40% |
| Levasil CC 401 | 40% |

EXAMPLE 3.10 NEUTRAL SILICA SOL

| | |
|---|---|
| 3,3,4,4,5,5,6,6-Nonafluorohexyltrimethoxysilane | 0.1% |
| Hexadecyltrimethoxysilane | 1.2% |
| α-iso-Tridecyl-omega-hydroxy-polyglycol ether | 0.25% |
| H$_2$O | 18.45% |
| Levasil CC 301 | 40% |
| Levasil CC 401 | 40% |

EXAMPLE 4—FUNCTIONALIZATION

Compounds for the admixture thereof to the infiltration composition or to the colloidal silica sol or water glass and the functionalization resulting thereof are set forth in this example. The percentage values are understood as percentage by weight and relate in each case to the total weight of the infiltration composition or of the colloidal silica sol or water glass. Individual compounds or also mixtures and/or combinations can be used.

| | | |
|---|---|---|
| antibacterial/ antiviral/ antimoss: | Cu salts | 0.005-2% |
| | Sn salts | 0.005-2% |
| | Zn salts | 0.005-2% |
| | Rhozone (Dichlorooctylisothiazolinone) | 0.5-2% |
| antistatic: | silver nitrate | 0.005-1% |
| | metal oxides | 0.5-5% |
| | CuO | |
| slip inhibition: | $Zr_2O_3$ | 0.1-50% |
| | $Al_2O_3$ | |
| surface hardness: | $Zr_2O_3$ | 0.1-50% |
| | $Al_2O_3$ | |
| | BN | |
| chemical resistance: | Hexadecylsilane | 0.05-10% |
| | $Zr_2O_3$ | 0.1-50% |

The present invention is further defined in the embodiments that follow.

1. Method for infiltrating a ceramic, artificial or natural stone surface, wherein a material forming a bond with valences on the surface is applied and rubbed onto the surface, whereby frictional heat is generated, wherein the material is used as a solution or suspension, and comprising the following steps:
   (a) applying a hydrophobizing infiltration composition onto the surface to be treated,
   (b) rubbing in until a homogeneous distribution and filling of the pores in the surface is achieved
   (c) drying and blowing the surface and
   (d) abrading or polishing off excess of material,
   whereby when the infiltration composition reacts in the cavities present in the thus treated substrate tridimensional grid or scaffold structures are formed, which increase the material density and increase the mechanical stability along the penetration depth of the infiltration composition.
2. Method according to embodiment 1, characterized in that steps (a) and (b) are repeated once or several times, preferably once, twice or three times.
3. Method according to any of embodiments 1 to 2, characterized in that the hydrophobizing infiltration composition contains two or more from the group consisting of hybrid polymer, alkyl silanes, aryl silanes, aminofunctional silanes, esters of silicic acids, chlorosilanes, organofunctional silanes, fluoroalkylsilanes, silazanes, epoxy- and glycolfunctional silanes, mercaptofunctional silanes, vinylfunctional silanes, isocyanatosilanes, silicone resin, poly-di-$C_{1-6}$-alkylsiloxan, $C_{8-18}$-Alkyl-tri-$C_{1-4}$-alkoxysilan, wherein the alkyl groups of both preceding compounds are optionally substituted with one or more fluorine atoms, siloxane oligomer, polysiloxane, aminofunctional polysiloxane, silicone oil, $C_{1-4}$-alkanol, $C_{1-4}$-carboxylic acid and water.
4. Method according to any of embodiments 1 to 3, characterized in that the infiltration composition further comprises one or more compounds from the group consisting of $SiO_2$, $Al_2O_3$, BN, $B_2O_3$, SiC, SiN, $TiO_2$ and $Zr_2O_3$.
5. Method according to any of embodiments 1 to 4, furthermore comprising before step (a):
   i. applying a colloidal silica sol or a water glass composition, followed by rubbing in until a homogeneous distribution and filling of the pores in the surface is achieved,
   ii. drying the surface and polishing off an excess of material, and
   iii. optionally repeating once or several times steps i. and ii., preferably repeating once.
6. Method according to embodiment 5, characterized in that the colloidal silica sol used contains amorphous $SiO_2$ with a particle size of 0.1 to 500 nm, preferably 0.1 to 150 nm, more preferably with a mean particle size $D_{50}$ from 15 to 30 nm, in particular 20 nm, is configured in a neutral, acidic, alkaline manner, and/or is anionically or cationically stabilized and the colloidal silica sol is optionally modified with acids, bases, catalysts, polysiloxane, organopolysiloxane, siloxane, silane, silicone oil and/or epoxysilane.
7. Method according to embodiment 5 or 6, characterized in that the silica sol further comprises one or more compounds from the group consisting of $SiO_2$, $Al_2O_3$, $TiO_2$, and $Zr_2O_3$.
8. Method according to any of embodiments 1-7, characterized in that step (b) and/or step ii. is carried out under a temperature increase from 5 to 120° C., in the event of a lower warming preferably under a temperature increase from 0 to 30° C., more preferably under a temperature increase from 0 to 10° C., and in the event of a higher warming preferably under a temperature increase from 30 to 120° C., more preferably under a temperature increase from 50 to 80° C.
9. Method according to any of embodiments 1 to 8, characterized in that the surface is selected from natural stone, ceramics, Lappato and hydraulically, inorganically or resin-bound natural stone, quartz, ceramic, glass and/or artificial stone agglomerate.
10. Method according to any of embodiments 1 to 9, characterized in that the ceramic, artificial or natural stone surface is the surface of a plate, of a slab or of a tile, in particular the surface of artificial stones made of hydraulically or resin-bound natural stone, ceramic, glass, and/or quartz agglomerates.
11. Ceramic, artificial or natural stone substrate, in particular a hydraulically, inorganically or resin-bound natural stone, quartz, ceramic, glass, and/or artificial stone agglomerate, processed with a method according to any of embodiments 1 to 10.
12. Ceramic, artificial or natural stone substrate according to embodiment 11, characterized in that it is highly glossy, matt, satined, antibacterial, anti-moss, scratch-resistant, scratch-proof, abrasion-proof, slip-resistant, stain-resistant, resistant to chemicals, footprint-resistant, photocatalytic, antistatic, electrically conductive, heat-reflecting and/or heat-absorbing.

The invention claimed is:
1. Method for infiltrating a ceramic, artificial or natural stone surface, wherein a material forming a bond with valences on the surface is applied and rubbed onto the surface, whereby frictional heat is generated, wherein the material is a self-repelling hydrophobizing infiltration composition and is used as a suspension, and the method comprises the following steps:
   (a) applying a self-repelling hydrophobizing infiltration composition onto the surface of a ceramic, artificial or natural stone,
   (b) rubbing in the self-repelling hydrophobizing infiltration composition until a homogeneous distribution and filling of the pores in the surface is achieved, whereby an excess of material of self-repelling hydrophobizing infiltration composition remains on the surface,
   (c) drying the surface, and
   (d) abrading or polishing off excess of material of self-repelling hydrophobizing infiltration composition remaining on the surface, whereby when the self-repelling hydrophobizing infiltration composition reacts in the cavities present in the thus treated ceramic, artificial or natural stone, tridimensional grid or scaffold structures are formed, which increase the material density and increase the mechanical stability along the penetration depth of the infiltration composition, wherein the self-repelling hydrophobizing infiltration composition comprises from 0.1 to 25% weight $C_{1-4}$-alkanol, and the self-repelling hydrophobizing infiltration composition is used as an aqueous suspension, and wherein the ceramic, artificial or natural stone surface is the surface of a plate or slab of a size greater than 30×30 cm.

2. Method according to claim 1, wherein step (c) further comprises blowing the surface.

3. Method according to claim 1, wherein the step sequence (a) and (b) is repeated once or several times.

4. Method according to claim 1, wherein the self-repelling hydrophobizing infiltration composition further comprises one, or more from the group consisting of poly-di-$C_{1-6}$-alkylsiloxanes, $C_{8-18}$-Alkyl-tri-$C_{1-4}$-alkoxysilanes, polysiloxane, aminofunctional polysiloxanes, and $C_{1-4}$-carboxylic acids.

5. Method according to claim 1, wherein the self-repelling hydrophobizing infiltration composition further comprises a $C_{1-4}$-carboxylic acid and one, two or more selected from the group consisting of poly-di-$C_{1-6}$-alkylsiloxanes, $C_{8-18}$-Alkyl-tri-$C_{1-4}$-alkoxysilanes, and aminofunctional polysiloxanes.

6. Method according to claim 4, wherein the $C_{8-18}$-Alkyl-tri-$C_{1-4}$-alkoxysilane is hexadecyltrimethoxysilane, and/or the poly-di-$C_{1-6}$-alkylsiloxane is polydimethylsiloxane.

7. Method according to claim 1, wherein the water content in the self-repelling hydrophobizing infiltration composition ranges between 50% and 90% of the total weight of the composition.

8. Method according to claim 1, wherein the self-repelling hydrophobizing infiltration composition further comprises one or more compounds from the group consisting of $SiO_2$, $Al_2O_3$, BN, $B_2O_3$, SiC, SiN, $TiO_2$ and $Zr_2O_3$.

9. Method according to claim 1, furthermore comprising before step (a):
i. applying a colloidal silica sol or a water glass composition, followed by rubbing in until a homogeneous distribution and filling of the pores in the surface is achieved,
ii. drying the surface and polishing off an excess of material, and
iii. optionally repeating once or several times step sequence i. and ii.

10. Method according to claim 1, wherein, during step (b) and/or step (d) and/or the rubbing of step i. and/or the polishing of step ii. the temperature measured at the treated surface is increased by from 5 to 120° C.

11. Method according to claim 1, wherein the ceramic, artificial or natural stone surface is selected from natural stone, ceramics, Lappato and hydraulically, inorganically or resin-bound natural stone, quartz, ceramic, glass and/or artificial stone agglomerate.

12. Method according to claim 1, wherein the self-repelling hydrophobizing infiltration composition comprises from 1 to 10% weight $C_{1-4}$-alkanol.

13. Ceramic, artificial or natural stone substrate, in particular a hydraulically, inorganically or resin-bound natural stone, quartz, ceramic, glass, and/or artificial stone agglomerate, obtained by a method for infiltrating a ceramic, artificial or natural stone surface, wherein a material forming a bond with valences on the surface is applied and rubbed onto the surface, whereby frictional heat is generated, wherein the material is a self-repelling hydrophobizing infiltration composition and is used as a suspension, and the method comprises the following steps:

(a) applying a self-repelling hydrophobizing infiltration composition onto the surface of a ceramic, artificial or natural stone, (b) rubbing in the self-repelling hydrophobizing infiltration composition until a homogeneous distribution and filling of the pores in the surface is achieved, whereby an excess of material of self-repelling hydrophobizing infiltration composition remains on the surface, (c) drying the surface, and (d) abrading or polishing off excess of material of self-repelling hydrophobizing infiltration composition remaining on the surface, whereby when the self-repelling hydrophobizing infiltration composition reacts in the cavities present in the thus treated ceramic, artificial or natural stone, tridimensional grid or scaffold structures are formed, which increase the material density and increase the mechanical stability along the penetration depth of the infiltration composition, wherein the self-repelling hydrophobizing infiltration composition comprises from 0.1 to 25% weight $C_{1-4}$-alkanol, and the self-repelling hydrophobizing infiltration composition is used as an aqueous suspension, and wherein the ceramic, artificial or natural stone surface is the surface of a plate or slab of a size greater than 30×30 cm.

14. Ceramic, artificial or natural stone substrate according to claim 13, wherein step (c) further comprises blowing the surface.

15. Ceramic, artificial or natural stone substrate according to claim 13, wherein the self-repelling hydrophobizing infiltration composition further comprises one, or more from the group consisting of poly-di-$C_{1-6}$-alkylsiloxanes, $C_{8-18}$-Alkyl-tri-$C_{1-4}$-alkoxysilanes, aminofunctional polysiloxanes, and $C_{1-4}$-carboxylic acids.

16. Ceramic, artificial or natural stone substrate according to claim 13, wherein the self-repelling hydrophobizing infiltration composition further comprises a $C_{1-4}$-carboxylic acid and one, two or more selected from the group consisting of poly-di-$C_{1-6}$-alkylsiloxanes, $C_{8-18}$-Alkyl-tri-$C_{1-4}$-alkoxysilanes, and aminofunctional polysiloxanes.

17. Ceramic, artificial or natural stone substrate according to claim 13, wherein the water content in the self-repelling hydrophobizing infiltration composition ranges between 50% and 90% of the total weight of the composition.

18. Ceramic, artificial or natural stone substrate according to claim 13, wherein the method further comprises before step (a):
i. applying a colloidal silica sol or a water glass composition, followed by rubbing in until a homogeneous distribution and filling of the pores in the surface is achieved,
ii. drying the surface and polishing off an excess of material, and
iii. optionally repeating once or several times step sequence i. and ii.

19. Ceramic, artificial or natural stone substrate according to claim 13, wherein the ceramic, artificial or natural stone surface is selected from natural stone, ceramics, Lappato and hydraulically, inorganically or resin-bound natural stone, quartz, ceramic, glass and/or artificial stone agglomerate.

20. Ceramic, artificial or natural stone substrate according to claim 13, wherein the self-repelling hydrophobizing infiltration composition comprises from 1 to 10% weight $C_{1-4}$-alkanol.

* * * * *